May 9, 1961     H. E. QUEHL, JR     2,983,638
LAMINATING BLANKET
Filed Feb. 5, 1958

INVENTOR
HENRY E. QUEHL, JR.
BY P. J. Poindexter
AGENT

United States Patent Office 2,983,638
Patented May 9, 1961

2,983,638

LAMINATING BLANKET

Henry E. Quehl, Jr., Norwalk, Conn., assignor to E. I. du Pont de Nemours and Company, Wilmington, Del., a corporation of Delaware Filed Feb. 5, 1958, Ser. No. 713,492

4 Claims. (Cl. 154—54)

This invention relates to a new laminating blanket and to a novel method of making the same.

By the term "laminating blanket" as used throughout the specification and claims is meant a flexible air impermeable membrane or sheet to which fluid pressure is applied during various bonding, forming and laminating processes.

One of the most advantageous methods currently known for making fuselage sections and other shaped structural members for modern aircraft is exemplified as follows: A sheet of lightweight core material such as honeycombed aluminum is coated on both sides with a thermosetting adhesive, e.g. an epoxy resin composition. On both sides of the adhesisve-coated core is positioned a thin sheet of lightweight metal, such as aluminum or titanium. The resulting sandwiched assembly is placed in the cavity of a female mold. A laminating blanket in the form of a rubber-like sheet or elastomer-coated fabric fitted with one or more exhaust vents is then superposed over the assembly and clamped to the top edge of the mold. Substantially all the air is evacuated from the airtight enclosure formed by the laminating blanket and the mold through the exhaust vents by means of a vacuum pump, thereby forcing the blanket against the sandwich assembly under a uniform fluid pressure of about 15 lbs. per square inch, viz, atmospheric pressure. The sandwich thus assumes the shape of the mold cavity. While maintaining the vacuum beneath the blanket, the entire assembly is subjected to the heated pressurized atmosphere of an autoclave, employing sufficient temperature, pressure and time to cure the adhesive and to convert the sandwich assembly into a shaped and firmly bonded laminate. As is known in the art, this method is not restricted to the use of concave or female molds, i.e. it is possible to operate this method with convex or male molds, as well as irregularly shaped molds.

A serious limitation of the above vacuum-pressure lamination method is the lack of lateral ventilation of gases between the laminating blanket and the ply of the sandwich assembly in contact therewith. That is, a portion of the gases originally present within the evacuated enclosure and those generated by the adhesive during the curing cycle are unable to flow laterally towards the exhaust vents and tend to become trapped in the form of pockets or blisters beneath the blanket. These gas pockets are a source of costly rejects in the laminated product because they interfere with uniformity of pressure and in many cases inhibit the cure of the adhesive.

Attempts have been made to provide lateral ventilation beneath the blanket by laying several layers of glass fabric over the sandwich assembly prior to clamping the laminating blanket in position. Although the porous glass fabric layers do provide fairly satisfactory lateral ventilation, their use is undesirable and in many cases impractical because of others problems which they introduce. For instance, even though considerable care is taken in fitting and laying up the glass fabric layers, they are inclined to become wrinkled before or during the evacuation operation. Furthermore, during the curing cycle adhesive oozes out into the fabric layers from between the plies and through openings in the surface ply, bonding them to the surface of the laminated product.

A primary object of this invention is to provide a laminating blanket which enables gases to pass freely along the inner surface thereof towards the exhaust vents during bonding, laminating and forming cycles. It is also an object to provide a laminating blanket which is free of the foregoing limitations of glass fabric ventilation layers.

Another important object is to provide an economical method of making such a laminating blanket in a wide variety of shapes and sizes.

Other significant objects will become apparent from the following description of the invention.

The laminating blanket of this invention is a flexible resilient imperforate sheet having a surface configuration on one side comprising a flat unbroken marginal area enclosing a studded area containing numerous closely spaced flat-topped studs integral with the sheet, the tops of which are in the same plane as the marginal area. The recesses between the studs are interconnected, thus providing the blanket with highly efficient lateral ventilation characteristics. Preferably the blanket is made of a heat resistant elastomer such as silicone rubber.

I have discovered the following surprisingly effective method of making the novel laminating blanket. A continuous layer of uncured elastomer is calendered onto the surface of a flexible carrier strip to which is adhered a series of patterns cut from a perforated cured elastomer sheet material. The perforated patterns are spaced a suitable distance apart on the carrier strip. The calendered elastomer layer fills the perforations and completely covers and surrounds the patterns. After curing the calendered layer while in contact with the patterns and carrier strip, it is stripped therefrom and cut into individual blankets having a suitable width of unbroken flat marginal area. By the term "unbroken" is meant continuous and uninterrupted.

The principles and practice of this invention will be best understood from the following detailed description of a preferred embodiment selected for the purpose of illustration, with reference to the accompanying drawing in which.

A pattern material is first prepared by perforating a neoprene coated nylon fabric, the fabric being embedded in the midst of a durable sheet of cured neoprene rubber. The coated fabric has an overall thickness of about 50 mils and a Shore A durometer hardness value of about 60. Perforation of the coated fabric is performed on a conventional perforating machine, resulting in openings 11 as shown in Figure 2 measuring about 0.20 inch in diameter spaced in a staggered pattern with a distance of about 0.25 inch from center to center of adjacent holes.

Figure 1:
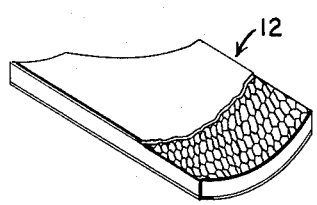
Figure 1 is a perspective view of a typical fuselage part produced with the aid of the new laminating blanket of this invention, with a portion of the top layer cut away to expose the central layer.
Figure 2:
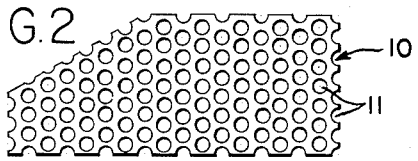
Figure 2 is a top view of a pattern cut to the top surface dimensions of the part shown in Figure 1 from a perforated sheet of neoprene coated fabric.

Patterns 10 such as shown in Figure 2 are cut from the perforated neoprene coated fabric pattern material to approximate the top surface dimensions of a fuselage part 12 as shown in Fig. 1. Patterns for structural parts of different shapes are cut in a like manner.

Figure 3:
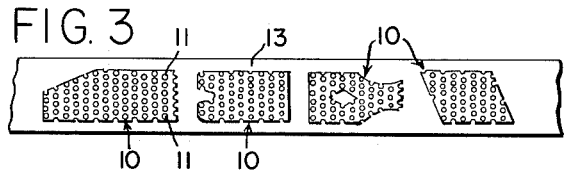
Figure 3 is a fragmentary top view of a paper carrier strip to which is adhered a series of perforated patterns, including a pattern similar to that shown in Figure 2.

Employing a phenol-formaldehyde resin modified neoprene rubber cement, a series of the various perforated patterns 10 are adhered to the top side of a long strip of carrier paper 13 in the manner illustrated in Figure 3. The paper is of the clay-coated kraft type widely used as a carrier material for calender sheet stock. There is a space of about 3 inches between patterns 10 at both edges of carrier strip 13. Carrier strip 13 with attached patterns 10 is wound up on a reel 14 for convenient storage and calender feeding.

Figure 4:
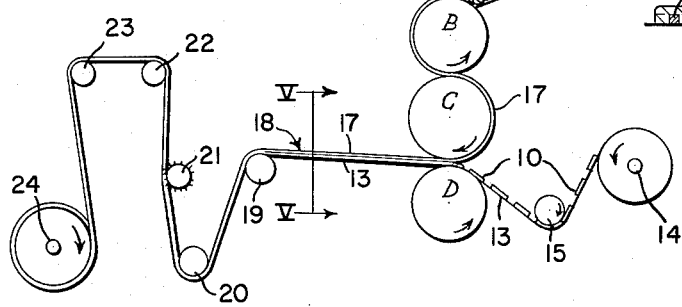
Figure 4 is a diagrammatic view in side elevation showing the calender application of the uncured elastomer layer onto the paper-strip-carried patterns shown in Figure 3.
Figure 5:
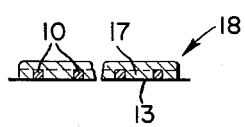
Figure 5 is an enlarged transverse cross-sectional view taken on line V—V of Figure 4 showing the manner in which the uncured elastomer covers the patterns.

With reference to Figure 4 of the drawing, carrier strip 13 with patterns 10 thereon is unwound from supply reel 14, passed beneath guide roll 15, and advanced towards the nip formed by calender rolls C and D. Simultaneously, a premixed batch of silicone rubber calender composition 16, curable to a Shore A durometer value of about 50 and having good flow properties, is fed into the nip of calender rolls A and B. Layer 17 of the silicone rubber, about 130 mils thick, is formed on calender roll C. Layer 17, supported by roll C, and carrier strip 13 with patterns 10 thereon pass between calender rolls C and D while in superposed relation, whereby layer 17 is forced into intimate contact with said strip 13 and patterns 10, filling the pattern perforations 11, covering the patterns 10 and surrounding paper strip 13 with a continuous imperforate layer 17 of uncured elastomer. The neoprene coated fabric pattern 10 does not deform from heat at the calendering temperature of the silicone rubber composition 16. The composite 18, comprising the carrier strip 13, patterns 10 and calendered layer 17, emerging from the calender is illustrated in Figure 5 in enlarged transverse cross-section taken on line V—V of Figure 4.

The composite 18 then passes over guide roll 19 and beneath talcing roll 20, which applies talc to the elastomer layer 17, to reduce surface tack. After rotating brush 21 removes excess talc, composite 18 passes over guide rolls 22 and 23, and is wound up on storage reel 24. Elastomer layer 17 is cured by passing composite 18 between two pressure elements (not shown) moving in an arcuate path, one element being a revolving heated drum and the other being an endless steel belt passing in a looped path about a portion of the drum's circumference. Such a curing apparatus is the "Rotocure" type disclosed in U.S. Patent 2,039,271. During the rotary curing cycle, elastomer layer 17, in contact with the heated drum, is subjected to a drum temperature of 300° F. and a pressure of 2,000 p.s.i. for a period of 5 minutes.

Silicone rubber layer 17 is now stripped from paper carrier 13 and patterns 10 and post-cured for 4 hours in a ventilated oven at a temperature of 480° F. After curing, layer 17 has a Shore A durometer value of 50. The portion of layer 17 stripped from the openings 11 of pattern 10 are in the form of studs 25 and recesses 26, as shown in Figure 7.

Figure 6:
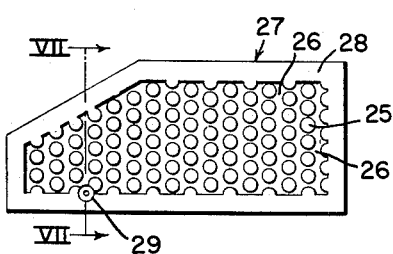
Figure 6 is a top view of a cured and trimmed laminating blanket made in accordance with this invention from a pattern similar to that of Figure 2 and suitable for use in making the part of Figure 1.

The fully cured silicone rubber studded sheet is cut into individual laminating blankets 27 having an unbroken marginal surface area 28 about one inch wide. A blanket made in accordance with this invention, with pattern 10 shown in Figure 2 is illustrated in Figures 6 and 7. Exhaust vent 29 is installed near the edge of the blanket.

Figure 7:
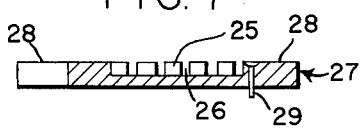
Figure 7 is a cross-sectional view taken on line VII—VII of Figure 6 showing the surface configuration of the laminating blanket.

It can be seen in Figures 6 and 7 that unbroken marginal area 28 encloses a studded area containing numerous closely spaced flat-topped cylindrical studs 25 which are an integral part of the blanket 27. It is also apparent that the tops of studs 25 are in the same plane as marginal surface 28. Because of the interconnected recesses 26 between studs 25, blanket 27 has excellent lateral ventilation characteristics when used for laminating. The recesses 26 between stud bases are about 50 mils wide at their narrowest portion.

Figure 8:
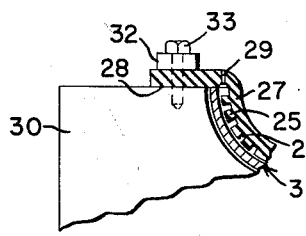
Figure 8 is a view in cross-section through an edge portion of an evacuated mold assembly showing the position of the new laminating blanket under actual use conditions.

The utility of the blanket thus produced is demonstrated by making fuselage part 12 shown in Figure 1. In Figure 8 is shown a cross-section through an edge portion of the laminating assembly with the plies 31, to be laminated, sandwiched between mold 30 and blanket 27, with clamp 32 and bolt 33 holding the blanket tight against the mold. The laminating assembly is subjected to high pressure steam at 320° F. for about 20 minutes to complete the bonding cycle. In carrying out the laminating process, novel blanket 27, is found to possess several advantages. It is surprisingly convenient and easy to use and unexpectedly efficient in performing its intended function. In contrast to the meticulous lay-up required, and the almost insurmountable wrinkle problem encountered when glass fabric layers are used for lateral ventilation beneath a smooth-surfaced laminating blanket, the new studded blanket 27 positions smoothly and assembles quickly.

Serving as an ideal sealing gasket between clamp 32 and mold 30, the solid marginal portion of the blanket has essentially the same total thickness as the studded portion. The flat-topped studs 25 function as numerous closely spaced individual pressure pads, enabling substantially uniform fluid pressure to be exerted on the entire sandwich assembly. The row of studs contacting the outer edge of the surface ply being laminated apply uniform pressure in a perpendicular direction, which is an important feature of this invention, for obtaining a proper bond at the critical edge portion of the plies being laminated.

During the bonding cycle, gases are readily vented laterally through recesses 26 in the surface of blanket 27 towards exhaust vents 29. Thus, the problem of gas pocket entrapment, so commonly encountered with prior art laminating blankets, is eliminated. On completion of the bonding cycle there is no tendency for exuded adhesive to adhere to blanket 27.

It will be understood that the foregoing embodiment merely illustrates the invention, which resides primarily in the discovery that a surprisingly suitable laminating blanket can be made by calendering a layer of elastomer composition onto a flexible carrier strip upon which is adhered a series of spaced-apart patterns cut from a sheet of perforated rubber-like material, curing the calendered layer while in contact with the strip-carried patterns, stripping the cured layer, and cutting therefrom individual blankets having the required surface configuration.

The essential features of the blanket's surface configuration are: a flat unbroken or uninterrupted marginal portion completely surrounding a studded portion which contains numerous closely-spaced flat-topped studs having their tops in the same plane as the marginal surface; and interconnected recesses between the studs of sufficient size to permit gases liberated during lamination to escape through them.

There is no particular limit to the width of the marginal portion, but a width of about 1 to 3 inches is usually sufficient for clamping to the mold with an air-tight seal. It is preferred that the overall thickness of the blanket be in the approximate range of 100 to 140 mils. While these limits are not critical, if thinner than about 100 mils the blanket will tend to lack the necessary toughness and resilience, and if thicker than about 140 mils it may be unnecessarily stiff, heavy, and costly. However, the blanket can be of any practical thickness within the spirit of this invention; the proper thickness to be used in any particular case will be governed to a certain extent by the required depth of the recesses and the required toughness of the blanket.

All of the studs in the studded area should be essentially of equal height, but they may differ in size and shape. Equal spacing of the studs is preferred but not essential. The tops of the studs should be generally flat, but not necessarily smooth. From the standpoint of convenience in perforating the pattern, circular shaped studs are preferred over the numerous other usable shapes.

The preferred height of the studs in any particular application, and the corresponding depth of recesses between them, will depend on such factors as stud diameter, width of the recesses, flow properties of the calendering composition, durometer hardness of the cured blanket, and the pressures to be used during lamination. As the stud height is increased, especially with small diameter studs, it becomes increasingly important that the calender composition have good flow properties in order to fill the deeper perforations of the pattern. Furthermore, an increase in stud height will often necessitate the use of a harder grade of blanket elastomer, an increase in stud diameter, or a decrease in laminating pressures to prevent excessive flattening of the studs and blocking of the recesses during use of the blanket.

While the useful diameter and height of the studs may vary over a wide range, good results are usually obtained with a diameter of about 0.10 to about 0.50 inch and a height of about .01 to .10 inch. For best dimensional stability of the studs, their height should be less than their diameter.

The recesses between the studs of the blanket should be of sufficient size and quantity to permit free lateral escape of gases during laminating cycles, but not wide enough to destroy the required uniformity of pressure. A recess depth and width of about .01 to .10 inch is adequate in most cases, but the dimensions can be varied according to the amount of lateral ventilation required.

In addition to the studded area, there may also be one or more unstudded areas within the margin of the blanket, for such purposes as the installation of exhaust vents or for plugging openings in the surface layer being bonded.

The laminating blanket of this invention can be made of a composition based on natural rubber, any of the synthetic rubbers or elastomers such e.g., neoprene, butyl rubber, copolymer of butadiene and styrene, copolymer of butadiene and acrylonitrile, and chlorosulfonated polyethylene, or other rubber-like materials such as e.g. plasticized vinyl chloride resin. A heat resistant and anti-adhesive elastomer, such as, e.g., silicone rubber is preferred when the blanket is to be used for adhesive bonding at elevated temperatures of about 300° F. or above. Vinyl chloride resin blankets, on the other hand, are useful only at relatively low bonding temperatures, viz. about 150° F. or below. It is only necessary that the calender composition have sufficient flow properties to fill the perforations in the patterns, and that it have a Shore A durometer hardness value of about 20 to 80, preferably about 50 to 60, in the cured or final condition.

Any known calendering method and equipment can be employed which is capable of applying a layer of the rubber-like composition to the carrier strip. The overall thickness of the calendered layer must be sufficiently greater than the depth of the perforations to result in a tough imperforate layer of elastomer bridging the recesses of the finished blanket. If desired, a fabric reinforcing layer can be embedded in the bridging layer.

The perforated patterns are made by perforating any suitable elastomer sheet material having a deformation temperature about 25° F. or more above the temperature at which the blanket forming composition is calendered on to the patterns. While not a critical limit, it is preferred to use a pattern material having a Shore A durometer hardness of about 50 to 70. The pattern material is preferably an elastomer coated fabric which resists distortion when calendering layer 17 thereon; an unsupported sheet of an elastomer can also be used. The pattern layer can be formed from natural rubber and synthetic rubbers. Preferably the elastomer of the pattern material is of different chemical composition from that of the calendered layer, so as to minimize adhesion between the two materials. If they are the same, an antihesive material should be applied to the patterns.

The configuration of the material forming the structure of the perforated pattern, cut to the surface dimensions of the laminated structure to be produced, becomes the configuration of recesses in the finished blanket. Wherever solid unstudded areas are wanted inside of the marginal area of the blanket, corresponding openings are cut in the pattern. The patterns may be any shape and size within the limits of calender width. Many different patterns may be made and used at the same time.

The flexibility of the process will be readily apparent at this point in terms of its importance to the aircraft industry in particular, with its rapidly changing styles and design of parts. To produce a laminating blanket for a newly designed or modified structural part is obviously a simple operation.

The carrier strip to which the patterns are attached may be any suitable flexible strip, such as paper, fabric, film or foil. Paper has the advantages of being low in cost and the patterns may be readily adhered thereto. When a woven textile fabric is used, the weave pattern is transferred to the stud and marginal surfaces of the blanket. Adhesion of the calendered layer to the carrier strip can be minimized by applying an anti-adhesive coating to the strip. The patterns are attached to the carrier by means of any suitable adhesive or other attaching means. The solid or unstudded portion of the layer of elastomer calendered onto the space of carrier strip surrounding each pattern becomes the marginal portion of the finished laminating blanket.

Any known elastomer curing method may be employed for curing the calendered layer while in contact with the strip-carried patterns, including oven, drum, autoclave, and "Rotocure" methods. Instead of applying talc to the calendered layer as an anti-adhesive material prior to curing, an anti-adhesive strip material can be wound into the wind-up roll. Silicone elastomer layers are post cured for about 4 to 48 hours after removal from the patterns at an elevated temperature that would destroy most pattern and carrier materials. Vinyl chloride resin layers of course only need to be cooled after calendering before they are stripped from the carrier.

The laminating blanket of this invention, and the method of making it have several important advantages which will be readily apparent to persons familiar with the art of vacuum or blanket laminating. For example, the method enables many like or unlike laminating blankets to be made in a simple economical operation, using ordinary materials and equipment. The surprisingly effective lateral ventilating quality of the blanket, achieved without sacrificing other operational qualities, will be seen as a considerable advance in the art.

In addition to their unique suitability for making fuselage parts, the novel laminating blankets obtainable by the method of this invention are also useful for making many other types of laminated, formed or bonded products, such as structural parts for homes, trailers, automobiles and boats.

While there are above disclosed but a limited number of embodiments of the structure, process and product of the invention herein presented, it is possible to produce still other embodiments without departing from the inventive concept herein disclosed, and it is desired there- The embodiments of the invention in which an exclusive property or privilege is claimed are defined as follows:

1. A laminating blanket comprising a rubber sheet having a surface configuration on one side which comprises a flat unbroken marginal portion and a studded portion enclosed thereby, the studded portion containing a plurality of closely-spaced flat-topped studs having their tops in the same plane as the surface of the marginal portion, interconnected recesses separating the studs; and at least one exhaust vent communicating with said recesses; said studded portion constituting the work engaging area of said blanket and containing studs in sufficient number and arrangement whereby gases formed between the blanket and work adjacent thereto can escape through said exhaust vent.

2. The product of claim 1 in which the rubber sheet is formed of silicone rubber.

3. The product of claim 1 in which the rubber sheet material has a Shore A durometer hardness of about 20 to 80.

4. The product of claim 1 in which the studs are cylindrical and have a diameter of about .10 to .50 inch and a height of about .01 to .10 inch.

References Cited in the file of this patent
UNITED STATES PATENTS

| | | |
|---|---|---|
| 1,917,062 | Reinhard | July 4, 1933 |
| 2,032,935 | Hurt | Mar. 3, 1936 |
| 2,441,097 | Hicks | May 4, 1948 |
| 2,525,070 | Greenwald et al. | Oct. 10, 1950 |
| 2,556,504 | Prestwick | June 12, 1951 |
| 2,622,040 | Harrison | Dec. 16, 1952 |
| 2,782,461 | Esslinger | Feb. 26, 1957 |